United States Patent [19]
Saunders et al.

[11] 3,844,713
[45] Oct. 29, 1974

[54] ALKYL AND ARYL PHOSPHITES TO INHIBIT OZONE FADING OF DYED POLYAMIDES

[75] Inventors: Peter Reginald Saunders; Brian Armstead Dementi; Robert Alden Lofquist, all of Richmond, Va.

[73] Assignee: Allied Chemical Corporation, New York, N.Y.

[22] Filed: Apr. 11, 1972

[21] Appl. No.: 243,061

[52] U.S. Cl............................ 8/165, 8/177, 8/172, 264/78
[51] Int. Cl............................................... D06p 5/00
[58] Field of Search........................ 8/165, 74, 171; 260/45.7 P

[56] References Cited
UNITED STATES PATENTS 3,533,986   10/1970   Davy .............................. 260/45.7 P
3,595,829   7/1971    Davy .............................. 260/45.7 P
3,644,575   2/1972    Nakatsuka ..................... 260/45.7 P

OTHER PUBLICATIONS

Defensive Publication on S.N. 791,501, 8780.G.1147 Sept. 29, 1970.

Primary Examiner—Donald Levy
Attorney, Agent, or Firm—Richard A. Anderson

[57] ABSTRACT

When from about 0.7 percent to about 3 percent of organic phosphites are coated on nylon fiber, or are added to the polymer prior to spinning, improved dye-fastness is achieved compared to an untreated dyed nylon fiber when this fiber is exposed to ozone.

5 Claims, No Drawings

3,844,713

ALKYL AND ARYL PHOSPHITES TO INHIBIT OZONE FADING OF DYED POLYAMIDES

BACKGROUND OF THE INVENTION

The object of this invention is to reduce or prevent the fading of dyed nylon fabrics, such as nylon carpets, caused by ozone.

Ozone is generally present in air at sea level at concentrations of only 1 to 5 parts per hundred million (pphm). Only under conditions of heavy smog, where sunlight acts on a combination of unburned hydrocarbons from gasoline and oxides of nitrogen does theozone concentration exceed these concentrations. However, even at the low ozone concentrations, if the humidity is high enough (e.g., over 75 percent R. H.) ozone fading occurs.

Ozone is a molecular form of oxygen which has three atoms of oxygen instead of the normal two atoms of oxygen per molecule. It is a very powerful oxidizing agent; and a strong electrophilic reagent, that is, it searches out and attacks electron pairs such as exist with carbon-carbon double bonds.

Dyes have a multiplicity of double bonds, and perhaps for this reason are very sensitive to ozone.

The dyes in nylon which are most seriously attacked are those which are mobile in the nylon, such as disperse dyes. Cationic dyes are also susceptible. The most sensitive disperse dyes are usually blue anthraquinone dyes, although there is evidence that under high humidity and high ozone concentration, almost all dyes are affected by zone.

High humidity is necessary to cause noticeable ozone fading. Apparently moisture provides the dye sufficient mobility to diffuse to the surface of the yarn where the destruction of the dye occurs.

A number of chemicals have been called antiozonants in the literature which protect rubber from ozone. Examples are paraphenylenediamine derivatives, and dihydroquinoline derivatives. In nylon, however, these chemicals seriously discolor the yarn, especially after exposure to light, severly limiting the use of such materials.

SUMMARY OF THE INVENTION

A method and composition have been found for improving the fastness of dyes when exposed to ozone in polycarbonamide fibers. The method consists of exposing the fibers to ozone in the presence of organic phosphite in or on the fiber. The preferred phosphites are tris(nonylphenyl)phosphite, triphenyl phosphite and tridecyl phosphite. The phosphite compounds are useful at a molecular weight of from 200 to 2,500. The preferred molecular weight of the phosphite is from about 250 to about 1,000, more preferably from about 300 to about 500. The preferred phosphorus content is from about 4 percent to about 15 percent.

The phosphites of this invention are produced commercially by, among others, the Weston Chemical Company of Montvale, New Jersey.

One of these phosphites or mixtures of them can be coated on nylon fiber in amounts from 0.5 percent to about 3 percent based on the weight of the fiber. Alternatively, the above compounds can be added to the polymer so that the yarns contain 0.6 percent to 3 percent of the compounds.

The rate of fading of the dye in nylon fibers, particularly disperse or cationic dyes, is substantially reduced by the incorporation or coating of these phosphites.

DESCRIPTION OF THE PREFERRED EMBODIMENTS

Some of the preferred embodiments of this invention are set forth in the following examples. The method of testing for ozone fading is similar to the AATCC Test 129–1968 set forth on page 334/15 of The Journal of American Association of Textile Chemists and Colorists, July 30, 1969, Volume 1, No. 16, in an article entitled, "A New Test Method for Ozone Fading at High Humidity", by Victor S. Salvin.

The method and the means of measuring the loss of dye consists in dyeing the yarn with a selected dye or dyes, exposing it to ozone at a concentration of 80 parts per hundred million in a test chamber together with a control nylon sample which was dyed an avocado shade. The control sample is examined periodically until the resulting color corresponds to that of the Standard of Fading (one cycle). It has been found that one cycle is completed when the internal standard has faded sufficiently to give a $\Delta E$ of 2.8, compared to the unexposed standard.

$\Delta E$ is a measure of the change of color between two samples, a smaller $\Delta E$ being a closer match, or less fading of one sample compared to the second sample.

This color difference, $\Delta E$, was measured with a Hunterlab Color Difference Meter. This instrument measures color as seen in average daylight in a manner similar to the way in which the human eye responds to the stimulus of color. Experimentation has shown that the eye can match any color with a combination of three "primary" colored lights, and therefore, that any color can be specified by a three dimensional identification. The Color Difference Meter measures the light reflected by a specimen through filters that correspond to the three "primary" lights. These measurements made correspond to the way the average human eye responds to light.

$$\Delta E = \sqrt{(\Delta L)^2 + (\Delta a)^2 + (\Delta b)^2}$$

where $\Delta L$ is $L_1 - L_2$
$\Delta a$ is $a_1 - a_2$
$\Delta b$ is $b_1 - b_2$ and $L$, $a$, and $b$ are readings on the Hunterlab color Difference Meter.

$L$ is a 100 to 0 reading of white to black;
$a$ indicates redness when positive, gray when zero, and green when negative;
$b$ indicates yellow when positive, gray when zero and blue when negative.

The following are examples of the subject additives and their behavior on being incorporated into or coated onto yarn, dyed and exposed to ozone, or on being coated on dyed sleeves and exposed to ozone.

ADDITIVE IN THE POLYMER

EXAMPLE 1

Ten (10) grams of tris(nonylphenyl)phosphite were blended with 1000 grams of nylon polymer chips, spun into yarn, dyed and exposed to ozone.

The polymer was a polycaprolactam of about 20,000 number average molecular weight, about 60 formic acid viscosity (FAV), about 50 amine ends per $10^6$ grams polymer and 50 carboxyl ends per $10^6$ grams polymer, which contained about 10 ppm of manganese as maganese chloride, about 25 ppm of phosphorus as hypophosphorous acid, and about 0.13 percent TiO$_2$ as a delustrant.

The polymer was spun into 16 filaments having a total denier of about 230, at a spinning temperature of about 260° to 265°C. The yarn was drawn at a ratio of 3.2.

The yarn was knitted into sleeves and dyed with Olive 1 dye which consists of 0.069 O.W.F. (on weight of fabric) C.I. Disperse Blue 3 (C.I. 61505), such as Celliton Blue FFRN, (1-methylamino-4-hydroxyethylaminoanthraquinone), 0.0807 percent O.W.F. Celliton Pink RF, and 0.465 percent O.W.F. Celliton Yellow GA (C.I. 11855). The C.I. Disperse Blue 3 is especially sensitive to ozone fumes.

The sleeves were scoured before dyeing with a solution of 0.5 percent O.W.F. Triton X-100, and 2.0 percent O.W.F. trisodium phosphate, at 205°F. for 1 hour. The sleeves were dyed individually so that the same amount of dye would be picked up by each sleeve.

The sleeves were then subjected to an ozone atmosphere of about 80 pphm ozone at a temperature of 104°F., at a relative humidity of at least 95 percent, for three cycles. A cycle is that amount of exposure which occurs when a nylon control fabric dyed Olive 1 shows a specified color change as measured by a colorimeter.

This method is similar to, but not identical with, proposed AATCC Test Method 129–1968.

The results of the sleeves being exposed to 3 cycles of ozone are as follows:

| Sample Number | Weight of Tris(nonylphenyl) Phosphite | Polymer Weight | ΔE |
|---|---|---|---|
| A | 10 grams | 1000 grams | 6.4 |
| B | 0 Control | 1000 grams | 8.4 |

The results show that the presence of tris(nonylphenyl)phosphite is effective in reducing the fading due to ozone.

ADDITIVE COATED ON FIBER

EXAMPLE 2

Polymer made from caprolactam, having a formic acid relative viscosity of 46, about 81 sulfonic groups from sodium sulfoisophthalate, about 90 carboxyls and about 25 amine ends per million grams of polymer, was spun into yarn. The yarn, coated with a commercially aqueous spin finish was drawn at a draw ratio of 2.9. The yarn had a Y cross-section with a 3.2 modification ratio and each filament had a denier of 15.

The yarn was chopped into 7 inch lengths, carded and spun into staple yarn having a cotton count of 2. The yarn was knitted into sleeves, and heat set by steam treating in an autoclave at 230°F. for five minutes followed by three 10-minute cycles of steam treatment at 260°F.

The sleeves were dyed to a moss green in a dye bath composed as follows:
0.3 percent Sevron Yellow 8GMF (DuPont)
0.25 percent Astrazon Blue 3RL (Verona) C.I. Basic Blue 47 (Synthesis shown in Outline of Industrial Organic Chemistry by A. Reich, 3rd Edition Pub. by Butterworth, London, Eng. 1968, page 528)
2.0 percent Hipochem PND-11
1.0 percent Hipochem CDL-60
and monosodium and/or disodium phosphate to adjust the pH to 7.±0.2.

The sleeve was cut into sections about 5 inches long and each section was weighed. The sleeves were then dipped in the methanol solutions shown below for 20 minutes. The sleeves were then removed from the solutions, dried and reweighed. The amount of material coated on the sleeves from each solution was based on the difference in weight between the coated and the uncoated sleeves, compared to the control.

The sleeves were then exposed to three cycles of ozone in an atmosphere of about 80 parts per hundred million of ozone at a temperature of 104°F., at a relative humidity of at least 95 percent. A cycle is that exposure which is completed when the internal nylon standard, dyed olive I, has faded sufficiently to give a Δ E of 2.8. The measurement Δ E is discussed under "Description of Preferred Embodiments".

The solutions, the amount of coating and the results of ozone exposure are listed below:

| | % Pickup | ΔE |
|---|---|---|
| a) Control 200 ml of ethanol | — | 17.0 |
| b) 1 gram of triphenyl phosphite in 200 ml ethanol | 1.00 | 12.2 |
| c) 1 gram of phenyl didecyl phosphite in 200 ml ethanol | 0.73 | 12.2 |

EXAMPLE 3

Dyed sleeves similar to those described in Example 2 were coated with the chemicals in solution listed below, and exposed to ozone as described in Example 2:

| | % Pickup | ΔE |
|---|---|---|
| a) Control 200 ml of ethanol | — | 12.1 |
| b) 2 grams of triphenyl phosphite in 200 ml ethanol | 1.68 | 3.5 |
| c) 2 grams of tridecyl phosphite in 200 ml ethanol | 1.73 | 4.0 |
| d) 0.5 gram of tris(nonylphenyl)phosphite in 200 ml ethanol | 0.57 | 9.2 |
| e) 1.0 gram of tris(nonylphenyl)phosphite in 200 ml ethanol | 1.09 | 7.1 |
| f) 2.0 grams of tris(nonylphenyl)phosphite in 200 ml ethanol | 2.14 | 3.2 |
| g) 4.0 grams of tris(nonylphenyl)phosphite in 200 ml ethanol | 3.01 | 3.0 |

EXAMPLE 4

Dyed sleeves similar to those described in Example 2 were coated with the solutions listed below and exposed to ozone as described in Example 2, for three cycles.

| | % Pickup | ΔE |
|---|---|---|
| a) Control in 200 ml trichloroethylene | — | 13.1 |
| b) 1 gram Weston 618* in 200 ml trichloroethylene | 0.8 | 6.9 |

*Weston 618 is a distearyl pentaerythritol diphosphite of formula weight 732 and containing 8.4% percent phosphorous.

EXAMPLE 5

Dyed sleeves similar to those described in Example 2 were coated with the solutions listed below and exposed to ozone as described in Example 2, for three cycles.

|  | % Pickup | ΔE |
|---|---|---|
| a) Control in 200 ml acetone | — | 14.7 |
| b) 1 gram Weston DHOP* in 200 ml acetone | 1.17 | 8.9 |

*Weston DHOP is a polymeric propoxylated phenyl phosphite, formula weight 2102 containing 11.8 percent phosphorus.

We claim:

1. In a method for dyeing nylon fibers with anthraquinone dyes, the improvement comprising coating the fiber with a substance consisting essentially of an aryl hydrocarbon, aralkyl hydrocarbon, saturated alkyl or a polymeric propoxylated phenyl organic phosphite having a molecular weight of from about 200 to about 2500 so that from about 0.7 to about 3 percent on weight of fiber of said phosphite remains on said fibers after dyeing whereby said dyed polycarbonamide fibers have improved dyefastness when exposed to ozone, said coating being applied subsequent to the dyeing fiber.

2. In a method of dyeing nylon fibers with anthraquinone dyes, the improvement comprising adding a phosphite of claim 1 to the polymer which forms said fiber before spinning, said phosphite remaining in said fibers in an amount from about .7 percent to about 3 percent on the weight of the fiber.

3. The method of claim 1 wherein said anthraquinone dyes are disperse dyes.

4. The method of claim 1 wherein said anthraquinone dyes are basic dyes.

5. The method of claim 1 wherein said phosphites are selected from the group consisting of triphenyl phosphite, tridecyl phosphite and tris(nonylphenyl)phosphite.

* * * * *